Oct. 3, 1939. C. E. ARMSTRONG 2,174,546
INDIRECT HEATING SYSTEM
Filed June 28, 1937 3 Sheets-Sheet 2

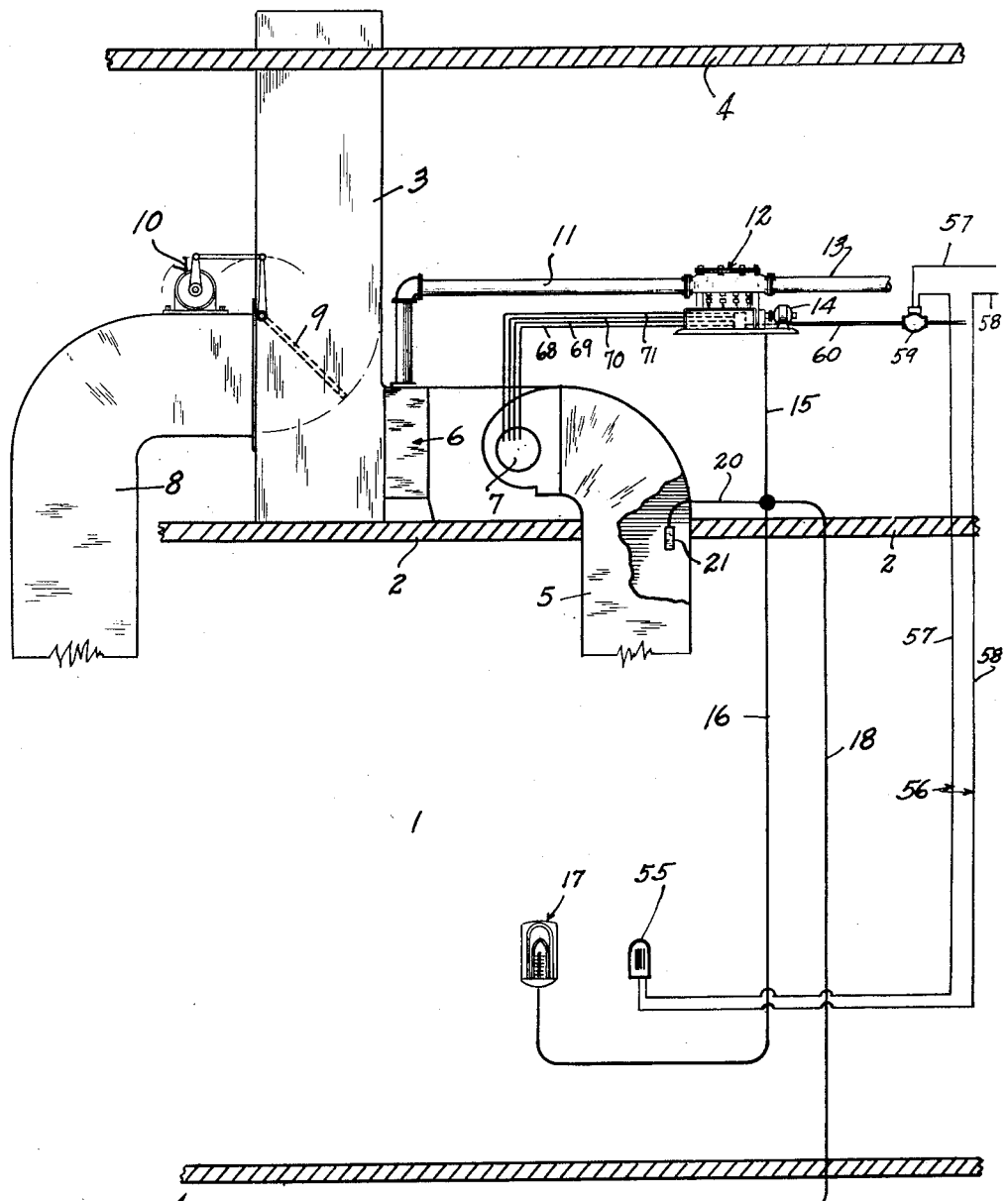

CHARLES E. ARMSTRONG
INVENTOR

BY
ATTORNEY

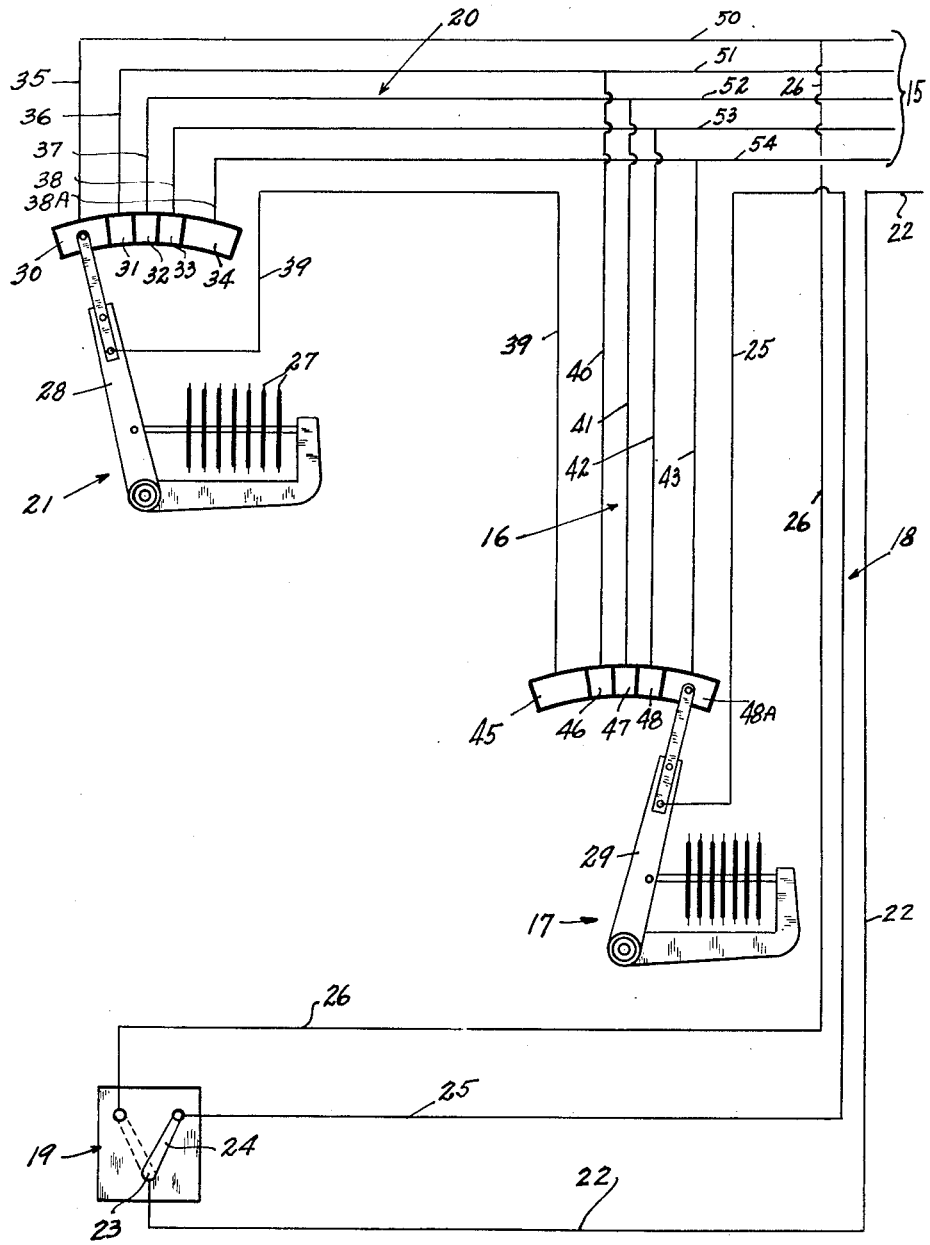

Patented Oct. 3, 1939

2,174,546

UNITED STATES PATENT OFFICE 2,174,546

INDIRECT HEATING SYSTEM

Charles E. Armstrong, Portland, Oreg., assignor to Armstrong Heat Control Company, Corvallis, Oreg.

Application June 28, 1937, Serial No. 150,770

2 Claims. (Cl. 236—37)

This invention relates to a system of indirect heating wherein a series of heating coils, a power driven air circulating device, such as a fan or blower, forces the air through heating ducts and into a space to be heated.

The invention has for its principal object the ability to regulate the temperature of the incoming air, by means of a thermostat disposed within the air-duct during such times that the temperature within the space to be heated is above a desired temperature range.

Another object is to obtain modulation, or even temperature control, of the incoming air without the necessity of by-pass dampers.

A further object is the provision of a single steam regulating unit embraced within a single steam supply line leading to the heating coils, whereby the flow or supply of steam to the coils may be varied by the operation of a single motor or valve actuating means.

A still further object is the provision of humidifying means whereby humidity is released into the air in proportion to the heat being released into the air. The supply of humidity is primarily governed by a humidostat which controls the supply as the demand exists within the space being heated. The advantage of this arrangement is that the humidity release is always in proportion to the heat release preventing the possibility of humidity release when no heat release is taking place.

These and other objects will appear as my invention is more fully hereinafter described in the following specification, illustrated in the accompanying drawings, and finally pointed out in the appended claims.

In the drawings:

Figure 1 illustrates one form of installation of an indirect heating system and my new and improved thermostatic controls in operative engagement therewith.

Figure 2 is a wiring diagram of the electrical circuits embracing the thermostatic controls.

Figure 3:
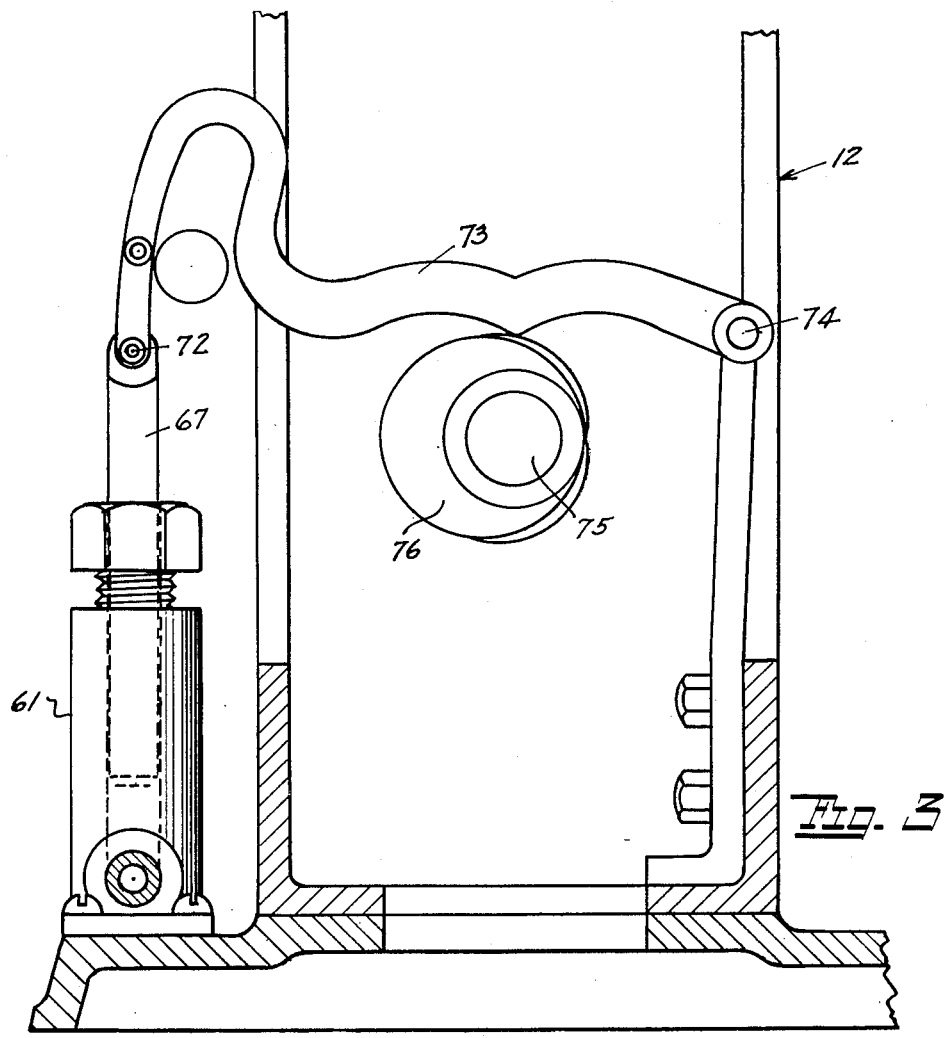
Figure 3 is a sectional end elevation of a multivalve housing showing my humidity releasing means in operative engagement therewith.

Referring now more particularly to the drawings:

In Figure 1, reference numeral 1 indicates a room or space to be heated. Reference numeral 2 indicates the ceiling of the room above which is mounted an air duct 3 extending through the roof 4 of the building into open communication with the outside atmosphere. The lower end of the duct 3 is in open communication with a delivery duct 5 extending into the space to be heated. 6 indicates any approved form of heating bank and 7 is a fan for propelling the air through the duct 3, heating bank, duct 5 and into the space 1. The heating bank may consist of any desired number of individual units or heating coils. A branch air duct 8 is in open communication with the duct 3 and is used for recirculating air within the space 1 when desired. A damper 9 and an electrically actuated control mechanism therefore, generally indicated at 10, are provided within the duct 3 for closing off all incoming air or for closing off all recirculation, or for regulating the same, for example, as would occur with the damper in the dotted line position shown whereby the air being delivered to the room is partially recirculated and partially supplied with fresh air from the duct 3.

The heating bank 6 is supplied with steam through a pipe 11 from a multi-port valve 12 in communication with a steam main 13. The various valves within the multi-port valve 12 are progressively opened and/or closed by an electric motor 14 embraced within an electrical circuit 15 which connects with a circuit 16 that embraces a room or space thermostat 17. The multi-port valve is the type shown and described in my reissue application, Serial Number 144,553, filed May 24, 1937. In this particular type of valve the motor 14 is operated periodically by the space thermostat 17 to open or close a predetermined number of valves to regulate the supply of steam to the heating bank in accordance with temperature requirements of a room thermostat. The motor is likewise operated by the duct thermostat 21, in accordance with its requirements, as will be more fully hereinafter described. The circuit 15 connects with a circuit 18 directed to the main supply line through any approved type of manually controlled master-switch 19. A branch circuit 20 embraces a thermostat 21 disposed within the air delivery duct 5. Electric current is supplied to the system through a wire 22 forming a part of the circuit 18 and connecting with a source of supply. The wire 22 connects with one terminal 23 of the master-switch 19 and by means of the switch blade 24 the current may be directed through wire 25 for automatic operation, or through wire 26 for manual control.

The duct-thermostat consists of any approved type of temperature sensitive element 27 adapted to move a contact arm 28 to the right on falling temperatures, and to the left on rising temperatures. The room thermostat is of similar construction and is also provided with a contact arm 29. The duct thermostat is provided with a plurality of contacts 30, 31, 32, 33 and 34 through which circuits may be closed by means of the arm 28 contacting said contacts to which wires 35, 36, 37, 38 and 38A are connected. These wires constitute the branch circuit 20. These wires connect as shown, with the circuit 16 which comprises wires 39, 40, 41, 42 and 43. The wires 39 to 43 connect with contacts 45, 46, 47 and 48 of the room thermostat 17. The contact arm 28 of the thermostat 21 is connected with contact 45 of the room thermostat 17 by wire 39. The contact arm of the room thermostat is connected with the master-switch 19 by means of wire 25. The circuit 15 comprises wires 50, 51, 52, 53 and 54, and these wires connect with a timing-switch (not shown) associated with the motor 14 for periodically operating the same for opening or closing a predetermined number of valves to supply variable amounts of steam to the heating banks 6.

The wire 50, in circuit 15, and numbered 35, in circuit 20, extends from the contact 30 of the duct thermostat to one part of the timing-switch mechanism for operating the valve motor to close all valves. The wire 51 in circuit 15 operates the motor through the switch to open one valve only. Wire 52 will open two valves; wire 53 three valves and wire 54 four valves. The wires 40 to 43 in circuit 16 interconnect with the wires 51 to 54 of circuit 15 and will correspondingly open the valves in like manner to the wires 51 to 54.

As previously pointed out, the wires 40 to 43 in circuit 16 connect with wires 36, 37, 38 and 38A which constitute circuit 20. The wires 35 to 38A connect with contacts 30 to 34 respectively of thermostat 21.

The various contacts of both thermostats represent different zones or degrees of temperature, for example, contact 48A of thermostat 17 may represent 69 degrees or approximately that, and contacts 48, 47, 46 and 45 may represent successively higher degrees of temperature. With the contact arm 29 of the thermostat 17, in the position shown, indicating that the room or space requires heat, it will be seen that current will flow from the source over wire 22, through the switch 19, over wire 25, through contact arm 29, contact 48A, wire 43, wire 54, and into the timing switch to operate the motor sufficiently to open all four valves of the multi-valve 12. As the room temperature rises and the contact arm 29 moves to the left and contacts for instance contact 48, the current will then flow over wire 42, wire 53 and will again operate the motor to close one of the valves and leave three valves open. If the room temperature should continue to rise and the contacts representing higher degrees of temperature are contacted, the valves will be progressively closed.

However, when the contact arm 29 reaches contact 45 the control of the multi-valve is transferred to the duct thermostat 21 by the current flowing from contact arm 29 through contact 45, wire 39, contact arm 28 of the thermostat 21, contact 30 thereof thence over wire 35 to the timing switch to operate the motor to close all the valves. When the room temperature goes to a maximum degree or beyond a predetermined degree of temperature and the control is transferred to the thermostat 21, said thermostat will actuate the valves through its contacts and corresponding wires of circuits 20 and 15 to actuate the valves to modulate or temper the incoming air. For example, if the heat were entirely shut off at the heating banks during low outside temperatures cold air would, of course, enter the duct and in the absence of heat would direct a cold draft to the interior of the room, or space, and would create an uncomfortable condition therein. The duct thermostat 21 prevents this undesirable condition by responding to the temperature of the incoming air and accordingly opens a predetermined number of the valves to supply the required amount of heat to the heating bank 6. The amount of heat supplied to the heating bank should be sufficient to warm the air to a few degrees lower than the desired room temperature. Assuming, for example, the desired room temperature is 72 degrees which is being normally maintained by the heating system, I have found it desirable to warm the incoming air to approximately 69 degrees since any great variation in temperature between that of the room and that of the incoming air will create the feeling of a cold draft anywhere within the zone of the incoming air from the duct 5.

It is to be remembered, however, that the duct thermostat controls the heating bank and the temperature of the delivered air only during such times that the room thermostat is dissatisfied or in other words, at any time the room temperature has gone above a predetermined maximum. During all other times, however, the room thermostat will control the steam to the heating banks.

Figure 4:
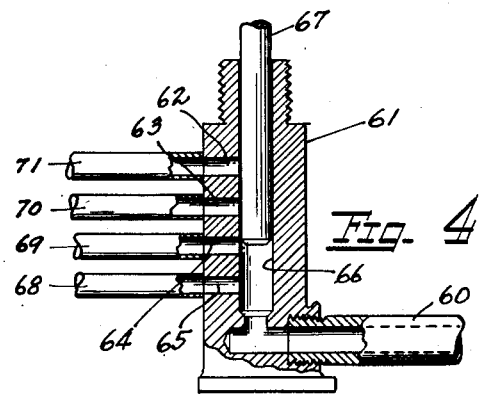
Figure 4 is a sectional detail view of a humidity releasing valve.

Also within the room or space 1, I provide a humidostat 55 adapted to open or close a circuit 56 consisting of wires 57 and 58. The wire 58 of this circuit connects with a source of supply and the other wire 57 connects with a solenoid-actuated valve 59 disposed within a water, or moisture, supply line 60 connected with a source of supply, not shown. The pipe 60 supplies water to a valve for distributing the same into the air duct 5. The valve (see Figures 3 and 4) comprises a hollow cylindrical body 61 provided with ports 62, 63, 64 and 65. The ports are in open communication with an internal bore 66 in which is slidably mounted a piston 67. By means of the piston the ports 62 to 65 may be progressively opened or closed to discharge various amounts of water through pipes 68, 69, 70 and 71 in open communication with the ports. The piston 67 is connected as at 72 with a link 73 which is pivotally mounted as at 74 to one wall of the casing of the valve 12. A cam shaft 75 is journaled within the end walls of the valve casing and is rotated by the motor 14 as aforesaid for actuating the valves through cams mounted on the shaft. The cam shaft is provided with an additional cam mechanism 76 for actuating the link 73 for raising or lowering the piston 67 to regulate the discharge of water through the apertures 62 to 65. At any time the humidostat calls for humidity, the valve 59 in the waterline 60 is opened and allows water to feed into the valve 61, and the amount of water discharged from the valve is in proportion to the amount of steam entering the heating bank. In other words, if one valve in the multi-valve is open then only port 65 is opened. The ports are progressively opened or closed correspondingly with the opening or closing of the ports 62 to 65. The tubes 68 to 71 are in open communication with the interior of the duct 5 and preferably enter the same at the location of the blower motor 7.

While I have shown a particular form of embodiment of my invention I am aware that many minor changes will suggest themselves to others skilled in the art without departing from the spirit and scope of the invention. Having thus described the invention, what I claim as new and desire to protect by Letters Patent is:

1. An indirect heating system comprising a delivery duct extending from the exterior of the building to the interior thereof, heating means disposed within the duct, means for regulating the heating means, a thermostat disposed within the duct responsive to the heating effect of said heating means and having a plurality of electrical contacts, a thermostat disposed within a room or space on the interior of the building and provided with a plurality of electrical contacts one of said contacts representing a predetermined range of maximum temperature, the other of said contacts connecting with the heat regulating means for actuating the same, all of the contacts on the duct thermostat being connected with the heat regulating means for actuating the same, and said room thermostat being connected through its one contact representing the maximum temperature range with said duct thermostat whereby the control of the heat actuating means may be transferred to the duct thermostat during temperatures at or above said predetermined maximum range.

2. An indirect heating system comprising an air delivery duct extending from the exterior of a building to the interior thereof, electrically controlled heating means disposed within the duct, a thermostat disposed within the duct responsive to the heating effect of said heating means, a thermostat disposed within a room on the interior of the building, each of said thermostats having a plurality of contacts, said electrically controlled heating means and both of said thermostats through their contacts being embraced within electrical circuits, certain contacts of the room thermostat representing a sub-normal temperature range whereby the room thermostat may control the electrically actuated heating means during said sub-normal temperature range, one of said contacts of the room thermostat representing an ab-normal temperature range, said one contact being connected with the duct thermostat for transferring the control of the electrically actuated heating means from the room thermostat to the duct thermostat whereby the duct thermostat may control the heating means only during ab-normal room temperatures.

CHARLES E. ARMSTRONG.